(12) United States Patent
Dong et al.

(10) Patent No.: US 11,281,573 B2
(45) Date of Patent: Mar. 22, 2022

(54) MODIFICATION-FREQUENCY-BASED TIERED DATA STORAGE AND GARBAGE COLLECTION SYSTEM

(71) Applicant: Dell Products L.P., Round Rock, TX (US)

(72) Inventors: Wei Dong, Shanghai (CN); Weilin Liu, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/672,071

(22) Filed: Nov. 1, 2019

(65) Prior Publication Data

US 2021/0109851 A1    Apr. 15, 2021

(30) Foreign Application Priority Data

Oct. 10, 2019    (CN) .......................... 201910958904.8

(51) Int. Cl.
*G06F 12/02* (2006.01)
*G06F 3/06* (2006.01)

(52) U.S. Cl.
CPC ........ *G06F 12/0246* (2013.01); *G06F 3/0611* (2013.01); *G06F 3/0652* (2013.01); *G06F 3/0653* (2013.01); *G06F 3/0659* (2013.01); *G06F 3/0679* (2013.01); *G06F 2212/1044* (2013.01)

(58) Field of Classification Search
CPC .. G06F 12/0246; G06F 3/0611; G06F 3/0652; G06F 3/0653; G06F 3/0659; G06F 3/0679; G06F 2212/1044

USPC ......................................................... 711/103
See application file for complete search history.

(56) References Cited

U.S. PATENT DOCUMENTS

| | | | |
|---|---|---|---|
| 2012/0096217 A1* | 4/2012 | Son ...................... | G06F 3/0616 711/103 |
| 2016/0179386 A1* | 6/2016 | Zhang .................. | G06F 3/0688 711/103 |
| 2018/0356997 A1* | 12/2018 | Gorobets .............. | G06F 3/0613 |
| 2019/0042146 A1* | 2/2019 | Wysoczanski ........ | G06F 3/0659 |

* cited by examiner

*Primary Examiner* — Gautam Sain
(74) *Attorney, Agent, or Firm* — Joseph Mencher

(57) ABSTRACT

A modification-frequency-based tiered data storage garbage collection system includes a storage device coupled to a host engine. The storage device includes a data storage and garbage collection engine and storage subsystems. The data storage and garbage collection engine receives first modified data from the host engine that provides a modification to first current data stored in a first data storage element provided by one of the storage subsystems and grouped in a first superblock associated with a first data modification frequency range. The data storage and garbage collection engine then determines a first frequency of modification of the first current data and, based on that, writes the first modified data to a second data storage element provided by one of the storage subsystems and grouped in a second superblock associated with a second data modification frequency range that is different than the first data modification frequency range.

20 Claims, 10 Drawing Sheets

MODIFICATION-FREQUENCY-BASED TIERED DATA STORAGE AND GARBAGE COLLECTION SYSTEM

CROSS-REFERENCE TO RELATED APPLICATIONS

This application claims priority to Chinese Application Serial No. 201910958904.8, filed Oct. 10, 2019, the disclosure of which is incorporated herein by reference in its entirety.

BACKGROUND

The present disclosure relates generally to information handling systems, and more particularly to storing data in an information handling system based on its frequency of modification in order to provide for improved garbage collection operations.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, typically include storage devices that perform garbage collection operations to free up storage space on the storage device for storing data. For example, Solid State Drive (SSD) storage devices operate by writing data to data storage elements (sometimes called "pages") that are included in NAND flash memory devices in the SSD storage device, with those data storage elements grouped into "blocks", while groups of those blocks may further be grouped into "superblocks". SSD storage devices are unable to overwrite existing data in a data storage element (e.g., as is done in overwrite operations performed by Hard Disk Drives (HDDs)), and instead must erase old data from all of the data storage elements in a particular block before writing new data to those data storage elements. As such, when data is first received, it is written to a first data storage element, and a Logical Block Address (LBA) for that data is associated with a Physical Allocation Address (PAA) for that first data storage element in an LBA/PAA table. Subsequently, when a modification to that data is received, the modified data is written to a different, second data storage element, the LBA for that data is associated with a PAA for that second data storage element in the LBA/PAA table, and the first data storage element is marked as an "invalid" data storage element (as opposed to "valid" data storage elements that include current/updated data). As such, each modification to data stored in a data storage element results in an invalid data storage element, and conventional storage devices are configured to perform garbage collection operations in order to "recover" those invalid data storage elements so that data may be subsequently written to them. However, conventional storage device garbage collection operations suffer from several issues.

For example, conventional storage devices may track the number of "valid"/"invalid" data storage elements that are included in a superblock. As discussed above, blocks of data storage elements may be grouped into superblocks, and the data writing operations discussed above will result in different superblocks including different numbers of "valid" and "invalid" data storage elements. When garbage collection operations are performed (e.g., when the number of "free" data storage elements that are available for writing data in the storage device is below a threshold level), the storage device may identify the superblock with the lowest number of "valid" data storage elements, and may select that superblock for garbage collection operations. The storage device may then move the data in any "valid" data storage elements in that superblock to free data storage elements in a different superblock, which allows each of the blocks in that superblock to have their "invalid" data storage elements erased and "freed up" for the storage of new data (as will be appreciated by one of skill in the art in possession of the present disclosure, while data can be written to individual data storage elements in an SSD storage device, only entire blocks of data in an SSD storage device can be erased.)

As such, the time needed to perform garbage collection operations for a storage device will depend on the number of "valid" data storage elements in the identified superblock with the lowest number of "valid" data storage elements. However, it has been found that the distribution of "valid" data storage elements in superblocks in a storage device can vary greatly, and in some cases can skew such that the superblock with the lowest number of "valid" data storage elements still includes a number of "valid" data storage elements that is high enough to introduce relatively significant latency into the garbage collection operations. For example, with garbage collection operations associated with data transfer speeds of 2-3 ms per word line, garbage collection operations can vary from 10 ms to hundreds of milliseconds in order to move all of the data in the "valid" data storage elements in an identified superblock, and garbage collection operations can extend into the scale of seconds for edge cases.

Accordingly, it would be desirable to provide an improved storage device garbage collection system absent the issues discussed above.

SUMMARY

According to one embodiment, an Information Handling System (IHS) includes a processing system; and a memory system that is coupled to the processing system and that includes instructions that, when executed by the processing system, cause the processing system to provide a data storage and garbage collection engine that is configured to: receive, from a host engine, first modified data that provides a modification to first current data that is stored in a first data storage element that is provided by one of a plurality of storage subsystems, wherein the first data storage element is grouped in a first superblock that is associated with a first data modification frequency range; determine a first frequency of modification of the first current data; and write, based on the first frequency of modification of the first current data, the first modified data to a second data storage element that is provided by one of the plurality of storage subsystems, wherein the second data storage element is grouped in a second superblock that is different than the first superblock and that is associated with a second data modification frequency range that is different than the first data modification frequency range.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
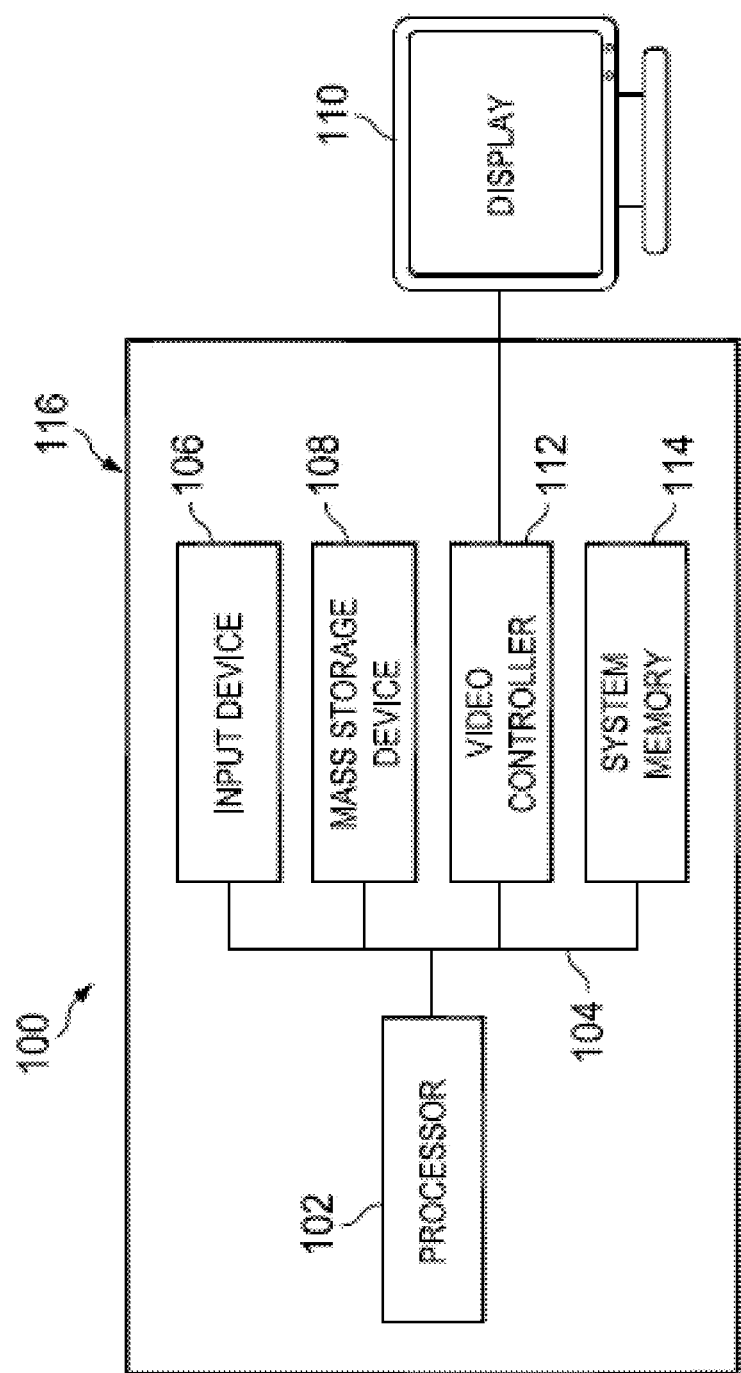
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
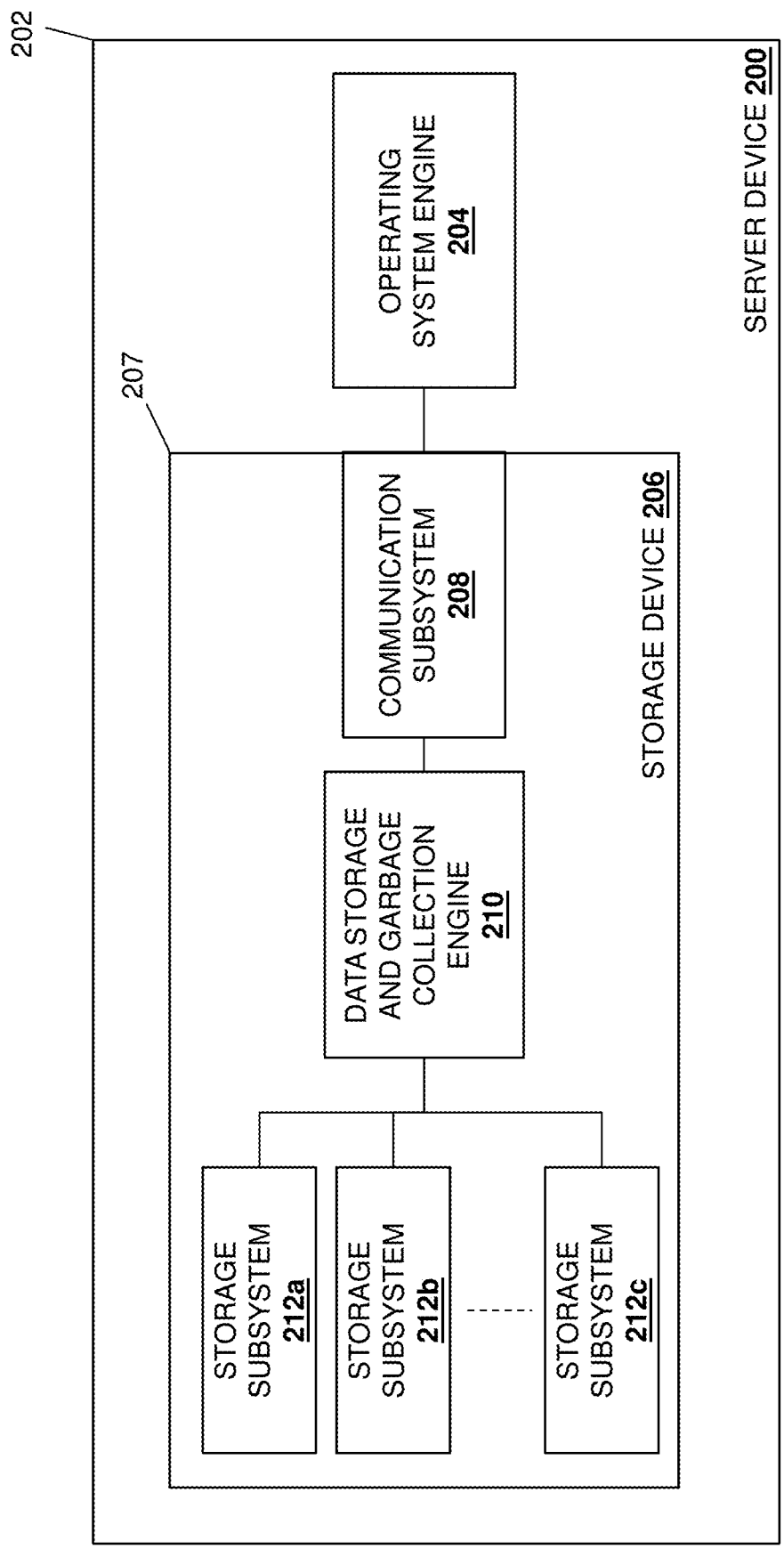
FIG. 2 is a schematic view illustrating an embodiment of a server device including the modification-frequency-based tiered data storage garbage collection system of the present disclosure.

Referring now to FIG. 2, an embodiment of a server device 200 is illustrated that may utilize the modification-frequency-based tiered data storage garbage collection system of the present disclosure. For example, the server device 200 may be provided by the IHS 100 discussed above with reference to FIG. 1 and/or may include some or all of the components of the IHS 100, and in the examples below utilizes the modification-frequency-based tiered data storage garbage collection system of the present disclosure in its storage system. However, while illustrated and discussed as a server device 200, one of skill in the art in possession of the present disclosure will recognize that the functionality of the server device 200 discussed below, and particularly the functionality of the modification-frequency-based tiered data storage garbage collection system of the present disclosure, may be provided by other devices that are configured to operate similarly as the storage system in the server device 200 discussed below. In the illustrated embodiment, the server device 200 includes a server chassis 202 that houses the components of the server device 200, only some of which are illustrated below.

For example, the server chassis 202 may house a host processing system (not illustrated, but which may include the processor 102 discussed above with reference to FIG. 1) and a host memory system (not illustrated, but which may include the memory 114 discussed above with reference to FIG. 1) that is coupled to the host processing system and that includes instructions that, when executed by the host processing system, cause the host processing system to provide an operating system engine 204 that is configured to perform the functionality of the operating system engines and/or server devices discussed below. For example, the operating system engine 204 may operate to provide an operating system that is configured to generate data and provide that data for storage in the storage system of the server device 200, receive data and provide that data for storage in the storage system of the server device 200, and/or provide data for storage in any of a variety of manners that would be apparent to one of skill in the art in possession of the present disclosure. However, while described as being provided by an operating system engine 204, one of skill in the art in possession of the present disclosure will recognize that the operating system engine 204 may be replaced by a variety of server/host subsystems and/or server/host engines while remaining within the scope of the present disclosure as well.

The server chassis 202 may also house a storage system (which may include the storage 108 discussed above with reference to FIG. 1) that is coupled to the server/host subsystems and/or engines. For example, in the illustrated embodiment, the storage system is provided by a storage device 206 that is coupled to the operating system engine 204 (e.g., via a coupling between the storage device 206 and the processing system). In the examples below, the storage device is provided by a Solid State Drive (SSD) storage device such as an NonVolatile Memory express (NVMe) SSD storage device, although one of skill in the art in possession of the present disclosure will recognize that other storage technologies may benefits from the teachings of the present disclosure and thus will fall within its scope as well. In the illustrated embodiment, the storage device 206 includes a storage chassis 207 that houses the components of the storage device 206, only some of which are illustrated in FIG. 2. For example, in the illustrated embodiment, the storage chassis 207 houses a communication system 308 that may be provided by a sever/host interface subsystem and/or other communication components that are configured to coupled to and interface with the operating system engine 204 (and/or other server/host subsystems and/or server/host engines) and/or perform other host interface functionality that would be apparent to one of skill in the art in possession of the present disclosure.

The storage chassis 207 may also house a storage processing system (not illustrated, but which may include the processor 102 discussed above with reference to FIG. 1) and a storage memory system (not illustrated, but which may include the memory 114 discussed above with reference to FIG. 1) that is coupled to the storage processing system and that includes instructions that, when executed by the storage processing system, cause the storage processing system to provide data storage and garbage collection engine 210 that is configured to perform the functionality of the data storage and garbage collection engines and/or storage devices discussed below. In a specific example, the data storage and garbage collection engine 210 may be provided by a SSD controller (e.g., an NVMe SSD controller) that may include a processor, a buffer manager, a flash controller, and/or any of a variety of other SSD controller components that would be apparent to one of skill in the art in possession of the present disclosure. However, similarly as discussed above, one of skill in the art in possession of the present disclosure will recognize that other data storage and garbage collection engines may be provided for other storage technologies while remaining within the scope of the present disclosure as well.

The storage chassis 207 may also house a plurality of storage subsystems 212a, 212b, and up to 212c. In the examples below, the storage subsystems 212a-212c are provided by NAND flash memory devices (e.g., utilized in an NVMe SSD storage device), but one of skill in the art in possession of the present disclosure will recognize that other storage subsystem technologies will benefit from the teachings of the present disclosure and thus will fall within its scope as well. For example, the storage device 206 is described below as an NVMe SSD storage device that may include storage subsystems 212a-212c provided by 16 NAND flash memory devices (although more or fewer NAND flash memory devices will fall within the scope of the present disclosure as well). Furthermore, while only a single storage device 206 is illustrated in FIG. 2, one of skill in the art in possession of the present disclosure will recognize that server devices may (and typically will) include many more storage devices, and any of those storage devices may operate similar to the storage device 206 discussed below. Furthermore, while a specific server device 200 with a specific storage device 206 have been illustrated, one of skill in the art in possession of the present disclosure will recognize that server devices (or other devices operating according to the teachings of the present disclosure in a manner similar to that described below for the server device 200) and storage devices (or other devices operating according to the teachings of the present disclosure in a manner similar to that described below for the storage device 206) may include a variety of components and/or component configurations for providing conventional server device and/or storage device functionality, as well as the functionality discussed below, while remaining within the scope of the present disclosure as well.

Figure 3:
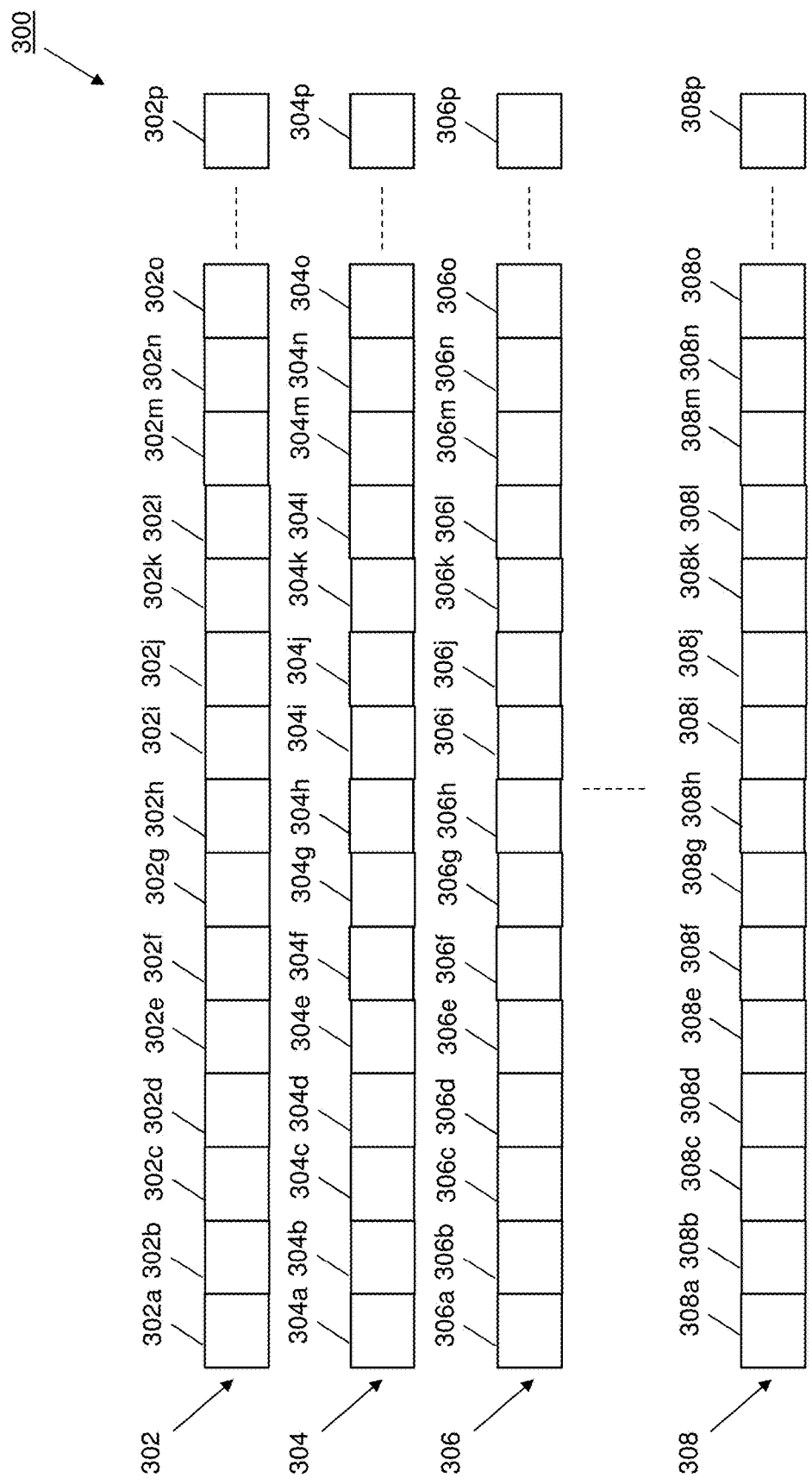
FIG. 3 is a schematic view illustrating an embodiment of modification-frequency-based tiered superblocks utilized in the modification-frequency-based tiered data storage garbage collection system of the present disclosure.

Referring now to FIG. 3, an embodiment of modification-frequency-based tiered superblocks 300 are illustrated that may be utilized with the modification-frequency-based tiered data storage garbage collection system of the present disclosure. As discussed above, superblocks may be utilized in garbage collection operations. In one example, an NVMe SSD storage device (e.g., the storage device 206) may include 16 NAND flash memory devices (e.g., the storage subsystems 212a-212c), with each of those NAND flash memory devices associated with 8 Logical Unit Numbers (LUNs). Furthermore, each LUN associated with a NAND flash memory device may include 1000-2000 blocks, and each block may include approximately 10,000 data storage elements, the data storage elements providing the minimum sized physical data storage units for storing data on the NAND flash memory devices. In some embodiments, superblocks may be made up of one block from each LUN associated with the NAND flash memory devices in the NVMe SSD storage device, which in the example above would provide (16 NAND flash memory devices*8 LUNs/NAND flash memory device*1 block/LUN=) 128 blocks for each superblock. However, data storage elements provided by the storage subsystems 212a, 212b, and up to 212c may be grouped into different superblocks in a variety of manners that would be apparent to one of skill in the art in possession of the present disclosure. Furthermore, while a specific example is described above, one of skill in the art in possession of the present disclosure will recognize that superblocks may be defined in different manners to include different numbers of blocks, data storage elements, and/or other characteristics while remaining within the scope of the present disclosure as well.

FIG. 3 illustrates an example of a plurality of superblocks 302, 304, 306, and up to 308, with the superblock 302 illustrated as including a plurality of data storage elements 302a-302p, the superblock 304 illustrated as including a plurality of data storage elements 304a-304p, the superblock 306 illustrated as including a plurality of data storage elements 306a-306p, and the superblock 308 illustrated as including a plurality of data storage elements 308a-308p. As discussed above in the specific example, provided above, the superblocks 302, 304, 306, and up to 308 may be made up of a block from each LUN associated with the storage subsystems 212a-212c (e.g., NAND flash memory devices) in the storage device 206, and thus one of skill in the art in possession of the present disclosure will recognize that the superblocks 302, 304, 306, and up to 308 will include many more data storage elements than the data storage elements 302a-302p, 304a-304p, 306a-306p, and 308a-308p, respectively, illustrated in FIG. 3.

As discussed in further detail below, the modification-frequency-based tiered data storage garbage collection system of the present disclosure may provide the superblocks 302, 304, 306, and up to 308 in modification-frequency-based tiers that each may be configured to store data according to its frequency of modification. In the examples below, the superblock 302 provides a highest modification frequency range superblock, the superblock 304 provides a relatively high-intermediate modification frequency range superblock, the superblock 306 provides a relatively low-intermediate modification frequency range superblock, and the superblock 302 provides a lowest modification frequency range superblock. However, while a few specific examples of modification-frequency-based tiered superblocks are described, one of skill in the art in possession of the present disclosure will recognize that different numbers of superblocks, different tier categories, and/or other characteristics of the modification-frequency-based tiered superblocks may be utilized in the present disclosure while falling within its scope as well. As such, in some embodiments, the data storage and garbage collection engine 210 in the storage device 206 may be programmed with, have access to, and/or otherwise may be provided with any information about the modification-frequency-based tiered superblocks of the present disclosure, and in many examples may operate to generate those superblocks, maintain those superblocks, and/or perform any of a variety of other functionality with respect to those superblocks while remaining within the scope of the present disclosure.

Figure 4:
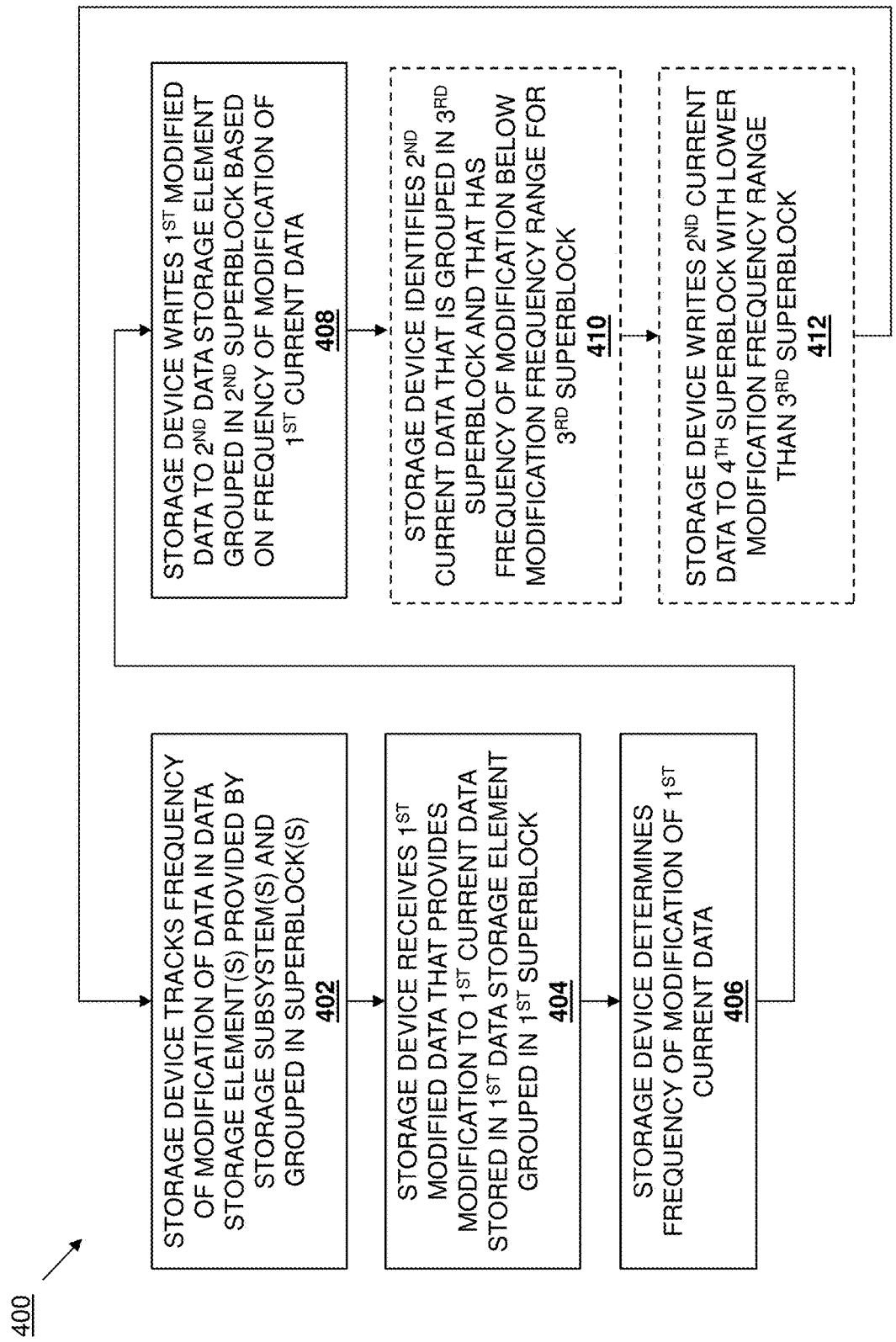
FIG. 4 is a flow chart illustrating an embodiment of a method for performing tiered data storage that is based on data modification frequency.

Referring now to FIG. 4, an embodiment of a method 400 method for performing tiered data storage that is based on data modification frequency is illustrated. As discussed below, the systems and methods of the present disclosure provide for the storage of modified data in data storage elements that are grouped in data-modification-frequency-based tiers of superblocks based on the frequency of modification of that data, which as discussed in further detail with regard to the method 500 below, provides advantages during garbage collection operations. For example, a storage device may operate to track the frequency of modification of data stored n data storage elements that are grouped in superblocks, and when that storage device receives "modified" data for any "current" data that is currently stored in a data storage element, it may determine the frequency of modification for that "current" data. Based on the frequency of modification for that "current" data, the storage device may write the "modified" data to a data storage element that is grouped in a different superblock than the superblock that includes the data storage element that stores the "current" data.

For example, different superblocks may be associated with different modification frequency ranges, and if the frequency of modification of first data is above a first modification frequency range of a first superblock in which its first data storage element is grouped, modified first data for that first data may be written to a second data storage element that is grouped in a second superblock associated with a second modification frequency range that is higher than the first modification frequency range. Similarly, if the frequency of modification of first data is below a first modification frequency range of a first superblock in which its first data storage element is grouped, modified first data for that first data may be written to a second data storage element that is grouped in a second superblock associated with a second modification frequency range that is lower than the first modification frequency range. As such, data is stored in data storage elements that are grouped in superblocks with different modification frequency ranges, resulting in modification-frequency-based tiers of superblocks made up of grouped data storage elements that store data that is modified relatively frequently, and modification-frequency-based tiers of superblocks made up of grouped data storage elements that store data that is modified relatively infrequently. As discussed below, storing data in such modification-frequency-based tiers of superblocks provides for distributions of valid data storage elements in superblocks with the lowest number of valid data storage elements that do not vary as greatly as in conventional garbage collection systems, thus reducing the amount of time needed to perform garbage collection operations in edge cases.

Figure 5A:
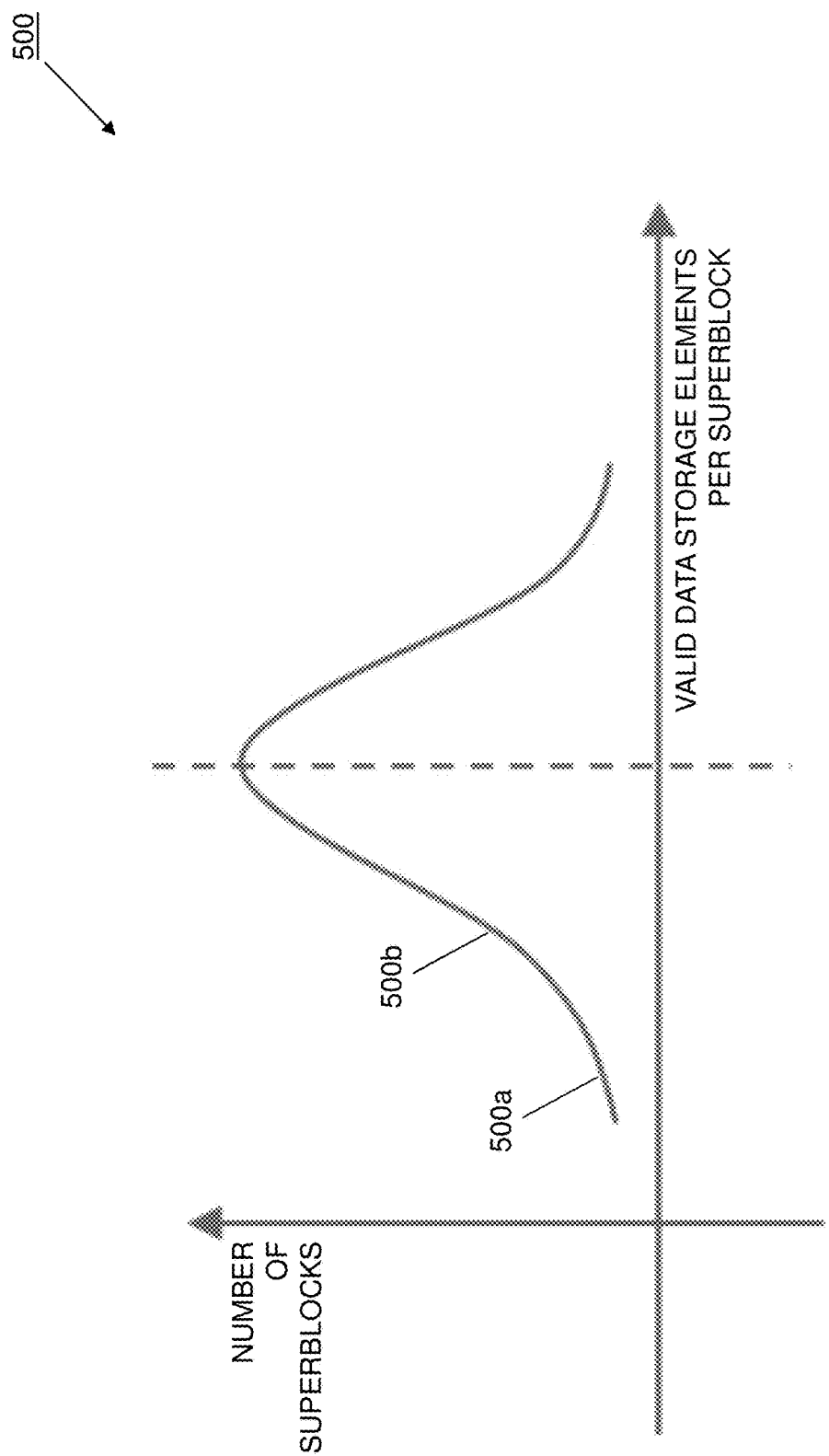
FIG. 5A is a graph view illustrating an embodiment of a conventional distribution of valid data storage elements in superblocks in a storage device.
Figure 5B:
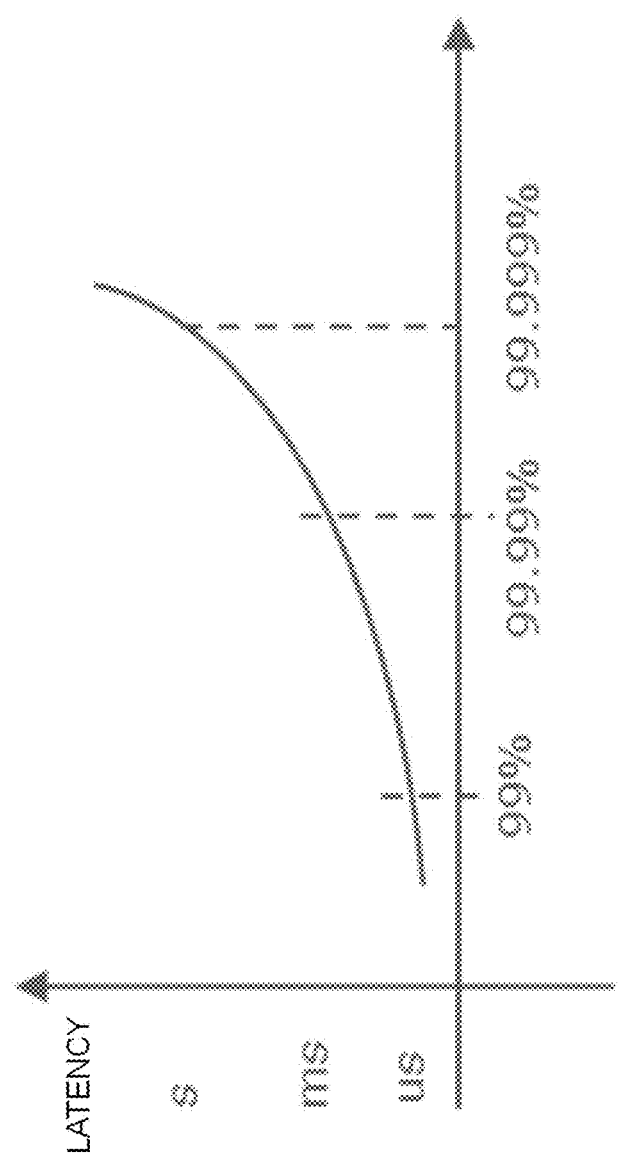
FIG. 5B is a graph view illustrating an embodiment of conventional garbage collection latency for superblocks in a storage device.

Referring first to FIGS. 5A and 5B, graph views are provided illustrating an embodiment of a conventional distribution 500 of valid data storage elements in superblocks in a storage device, as well as a conventional garbage collection latency 502 for superblocks in a storage device. As discussed above, conventional data storage and garbage collection operations provide for the storage and modification of data in data storage elements that are grouped in superblocks without consideration of the frequency of modification of that data. For example, data may be written to a first data storage element that is grouped in a first superblock such that is becomes "current" data, and when that "current" data is to be modified with "modified" data, the "modified" data will often be written to a second data storage element in that first superblock such that it becomes the "current" data, while the previously "current" data in the first data storage element becoming "old" data, and the first data storage element being marked as an "invalid" data storage element (as compared to the "valid" second data storage element that stores the newly modified/"current" data.) As will be appreciated by one of skill in the art in possession of the present disclosure, this process may be repeated each time the "current" data is modified, and may be performed for a variety of different data stored in the storage device, with the location of the "current" data tracked via an LBA/PAA table that associates the LBA for the "current" data with the PAA for the data storage element in which it is stored.

As such, data may be stored and modified in data storage elements grouped in different superblocks in a variety of conventional manners that tend to produce the conventional distribution 500 of "valid" data storage elements in superblocks illustrated in FIG. 5A. As would be appreciated by one of skill in the art in possession of the present disclosure, the conventional distribution 500 of "valid" data storage elements in superblocks graphs the distribution of valid data storage elements per superblock on the X-axis vs. the number of superblocks on the Y-axis, and illustrates how the number of valid data storage elements in the superblocks may substantially follow a bell curve. As discussed above, the storage device may track the number of valid data storage elements grouped in each superblock, which allows the selection of superblock with the lowest number of valid data storage elements (i.e., relative to the other superblocks utilized in the storage device) when performing garbage collection operations. As such, with reference to the conventional distribution 500 of "valid" data storage elements in superblocks, the superblock selected for garbage collection operations will typically include a number of valid data storage elements identified in the lower part of the bell curve at point 500*a*. However, as discussed above, in edge cases the number of valid data storage elements in the superblock with the lowest number of valid data storage elements (i.e., relative to the other superblocks utilized in the storage device) may skew higher (e.g., as identified in the higher part of the bell curve at point 500*b*), which can greatly increase the time needed to perform garbage collection operations (which includes writing the data in each of those valid data storage elements to data storage elements in a different superblock.)

For example, the conventional garbage collection latency 502 for superblocks illustrated in FIG. 5B shows how, in 99% of garbage collection situations, the number of valid data storage elements in the superblock with the lowest number of valid data storage elements will be at a level that results in a latency associated with the garbage collection operations that is on the order of microseconds (μs). Furthermore, the conventional garbage collection latency 502 for superblocks illustrated in FIG. 5B shows how, in 99%-99.99% of garbage collection situations, the number of valid data storage elements in the superblock with the lowest number of valid data storage elements will be at a level that results in a latency associated with the garbage collection operations that is between the order of microseconds (μs) to milliseconds (ms). Finally, the conventional garbage collection latency 502 for superblocks illustrated in FIG. 5B shows how, in 99.99%-99.999% of garbage collection situations, the number of valid data storage elements in the superblock with the lowest number of valid data storage elements will be at a level that results in a latency associated with the garbage collection operations that is between the order of milliseconds (ms) to seconds (s). As such, edge cases (e.g., 0.001% of garbage collection situations) may results in garbage collection operations taking on the order of seconds. As discussed below, the use of the modification-frequency-based tiers of superblocks described in the present disclosure may reduce these edge cases back to the order of milliseconds (ms) or lower.

The method 400 begins at block 402 where a storage device tracks a frequency of modification of data in data storage element(s) that are provided by storage subsystem(s) and that are grouped in superblock(s). In an embodiment, at block 402, that data storage and garbage collection engine 210 may operate to track the frequency of modification of data stored in data storage elements that are provided by the storage subsystems 212*a*-212*c* and that are grouped in superblocks (e.g., the data storage elements 302*a*-*p* in the superblock 302, the data storage elements 304*a*-*p* in the superblock 304, the data storage elements 306*a*-*p* in the superblock 306, and up to the data storage elements 308*a*-*p* in the superblock 308). For example, in some embodiments, the operating system engine 204 may generate "new" data (e.g., data that is not a modification of data already stored on the storage device 206), and transmit that "new" data to the storage device 206. The data storage and garbage collection engine 210 may then receive that "new" data via the communication subsystem 208, and provide that "new" data for storage in a data storage element that is provided by one of the storage subsystems 212*a*-212*c* and that is grouped in one of the superblocks 302, 304, 306, and up to 308.

In some embodiments, the storage of "new" data in a data storage element that is provided by one of the storage subsystems 212*a*-212*c* and that is grouped in one of the superblocks 302, 304, 306, and up to 308 may be performed in a conventional manner. For example, when the data storage and garbage collection engine 210 receives "new" data (e.g., that is not associated with an LBA in and LBA/PAA table maintained by the data storage and garbage collection engine 210), it may operate to provide that data in any data storage element that is provided by one of the storage subsystems 212*a*-212*c* and that is grouped in one of the superblocks 302, 304, 306, and up to 308 according to conventional techniques. However, in other embodiments, the storage of "new" data in a data storage element that is provided by one of the storage subsystems 212*a*-212*c* and that is grouped in one of the superblocks 302, 304, 306, and up to 308 may be performed based on a known modification frequency for that data, an estimated modification frequency for that data, a projected modification frequency for that data, and/or other assumptions about the modification frequency for that data.

For example, the operating system engine 204 (or application running on the operating system) may provide the data storage and garbage collection engine 210 the "new" data (e.g., that is not associated with an LBA in and LBA/PAA table maintained by the data storage and garbage collection engine 210) along with a known or expected frequency of modification for that data, which may allow the data storage and garbage collection engine 210 to provide that data in any data storage element that is provided by one of the storage subsystems 212*a*-212*c* and that is grouped in one of the superblocks 302, 304, 306, and up to 308 according to that known or expected frequency of modification (e.g., similarly as discussed below for "modified" data). In other examples, the data storage and garbage collection engine 210 may be configured to analyze the "new" data (e.g., that is not associated with an LBA in and LBA/PAA table maintained by the data storage and garbage collection engine 210) to determine a known or expected frequency of modification for that data (e.g., based on the type of data, based on the operating system or application that transmitted that data, etc.), which may allow the data storage and garbage collection engine 210 to provide that data in any data storage element that is provided by one of the storage subsystems 212*a*-212*c* and that is grouped in one of the superblocks 302, 304, 306, and up to 308 according to that frequency of modification (e.g., similarly as discussed below for "modified" data). However, while a few specific examples of storing "new" data based on a known, estimated, projected, and/or assumed modification frequency has been described, one of skill in the art in possession of the present disclosure will recognize that a variety of techniques for determining a frequency of modification that data will experience, and storing that data based on that frequency of modification, will fall within the scope of the present disclosure as well.

As such, in some embodiments and in response to receiving "new" data (and continuing with the specific example provided above), the data storage and garbage collection engine 210 may determine that the "new" data is associated with a relatively high frequency of modification and, in response, store that "new" data in one of the data storage elements 302*a*-*p* in the superblock 302; may determine that the "new" data is associated with a relatively high-intermediate frequency of modification and, in response, store "new" data in one of the data storage elements 304*a*-*p* in the superblock 304; may determine that the "new" data is associated with a relatively low-intermediate frequency of modification and, in response, store that "new" data in one of the data storage elements 306a-p in the superblock 306; or may determine that the "new" data is associated with a relatively low frequency of modification and, in response, store that "new" data in one of the data storage elements 308a-p in the superblock 308. In the examples below, once "new" data is stored in a data storage element that is provided by a storage subsystem and that is grouped in a superblock, it may be considered "current" data. Furthermore, the data storage and garbage collection engine 210 may maintain an LBA/PAA table that maps respective LBAs (which is associated with respective data that is stored on the storage subsystems 212a-212c) to the PAAs that identify the data storage element in which that data is currently stored. Further still, the data storage and garbage collection system of the present disclosure may also provide for modification frequency tracking for any data associated with an LBA. An example of such a first LBA/PAA table after storing "new" data is provided below:

| LBA | PAA | MODIFICATIONS |
|---|---|---|
| $X_1$ | 302a | 0 |
| $X_2$ | 304f | 0 |
| $X_3$ | 306b | 0 |
| ... | ... | 0 |
|  | 306m | 0 |
| $X_{N+1}$ | 308d | 0 |

As will be appreciated by one of skill in the art in possession of the present disclosure, the first LBA/PAA table illustrates an examples of how first "new" data associated with an LBA of "$X_1$" is initially stored in the data storage element 302a (e.g., the PAA for data storage element 302a) such that it becomes "current" data and is associated with no modifications, second "new" data associated with an LBA of "$X_2$" is initially stored in the data storage element 304f (e.g., the PAA for data storage element 304f) such that it becomes "current" data and is associated with no modifications, third "new" data associated with an LBA of "$X_3$" is initially stored in the data storage element 306b (e.g., the PAA for data storage element 306b) such that it becomes "current" data and is associated with no modifications, fourth "new" data associated with an LBA of "$X_N$" is initially stored in the data storage element 306m (e.g., the PAA for data storage element 306m) such that it becomes "current" data and is associated with no modifications, and fifth "new" data associated with an LBA of "$X_{N+1}$" is initially stored in the data storage element 308d (e.g., the PAA for data storage element 308d) such that it becomes "current" data and is associated with no modifications.

As such, at block 402 and following the storage of any amount of "new" data (e.g., randomly, or based on the frequency of modification determined for that "new" data as discussed above) such that it becomes "current" data, the data storage and garbage collection engine 210 may operate to track the frequency of modification of that "current" data. For example, in some embodiments, the operating system engine 204 may generate "modified" data (e.g., data that is a modification of data already stored on the storage device 206) and transmit that "modified" data to the storage device 206. The data storage and garbage collection engine 210 may then receive that "modified" data via the communication subsystem 208, and provide that "modified" data for storage in a data storage element that is provided by one of the storage subsystems 212a-212c and that is grouped in one of the superblocks 302, 304, 306, and up to 308. As discussed below, the tracking of the modification frequency of data stored in the data storage elements provided by the storage subsystems 212a-212c allows for data to be moved to data storage elements associated with different superblocks based on that modification frequency, but one of skill in the art in possession of the present disclosure will appreciated that one or more modifications to that data must be made in order to determine a modification frequency with some level of confidence that justifies movement of the data to data storage elements grouped in different superblocks.

As such, in some embodiments, the data storage and garbage collection engine 210 may receive "modified" data, write that "modified" data to a data storage element in a superblock (e.g., the same superblock that includes the data storage element storing the "current" data which that "modified" data is modifying, although writing to a different superblock will fall within the scope of the present disclosure as well) such that the "current data" becomes "old" data and the "modified" data becomes "current" data, mark the data storage element that stores the "old" data as an "invalid" data storage element, and update the modification frequency tracking for the "current" data. As will be appreciated by one of skill in the art in possession of the present disclosure, the data modification operations discussed above may be performed for the modification of any data, and may be performed any number of times. An example of a second LBA/PAA table after several data modification operations is provided below:

| LBA | PAA | MODIFICATIONS |
|---|---|---|
| $X_1$ | 302d | 35 |
| $X_2$ | 304h | 42 |
| $X_3$ | 306b | 0 |
| ... | ... | ... |
| $X_N$ | 306k | 11 |
| $X_{N+1}$ | 308e | 8 |

As will be appreciated by one of skill in the art in possession of the present disclosure, the second LBA/PAA table illustrates an example of how first "current" data associated with an LBA of "$X_1$" is currently stored in the data storage element 302d (e.g., the PAA for data storage element 302d) and has been modified 35 times, second "current" data associated with an LBA of "$X_2$" is currently stored in the data storage element 304h (e.g., the PAA for data storage element 304h) and has been modified 42 times, third "current" data associated with an LBA of "$X_3$" is currently stored in the data storage element 306b (e.g., the PAA for data storage element 306b) and has not been modified, fourth "current" data associated with an LBA of "$X_N$" is currently stored in the data storage element 306k (e.g., the PAA for data storage element 306k) and has been modified 11 times, and fifth "current" data associated with an LBA of "$X_{N+1}$" is currently stored in the data storage element 308e (e.g., the PAA for data storage element 308e) and has been modified 8 times. As will be appreciated by one of skill in the art in possession of the present disclosure, the data modification frequency tracking at block 402 may be performed throughout the method 400, and thus the number of modifications to the data tracked therein may continuously or periodically change.

The method 400 then proceeds to block 404 where the storage device receives first modified data that provides a modification to first current data that is stored in a first storage element that is grouped in a first superblock. In an embodiment, at block 404 and similarly as described above, the operating system engine 204 may generate "modified" data (e.g., data that is a modification of data already stored on the storage device 206), and transmit that "modified" data to the storage device 206. The data storage and garbage collection engine 210 may then receive that "modified" data via the communication subsystem 208. In some embodiments, the data storage and garbage collection engine 210 may identify "modified" data by determining that the "modified" data identifies an LBA that is included in the LBA/PAA table discussed above (and thus provides for a modification to "current" data that is currently stored in the storage subsystems 212a-212c and identified by that LBA.) However, other techniques for identifying "modified" data will fall within the scope of the present disclosure as well.

The method 400 then proceeds to block 406 where the storage device determines a frequency of modification of the first current data. In an embodiment, at block 406, the data storage and garbage collection engine 210 may operate to determine a frequency of modification for the "current" data that is to be modified by the "modified" data that was received at block 404. For example, the data storage and garbage collection engine 210 may identify the "current" data that is to be modified by the "modified" data that was received at block 404 (e.g., via the LBA identified by the "modified" data, or using other techniques as discussed above), and then identify the number of modifications and/or modification over time performed on the "current" data in order to determine the frequency of modification of that "current" data. In some embodiments, the number of modifications to "current" data stored on the storage subsystems 212a-212c may be tracked over time in order to allow for the determination of the frequency of modification of that current data. For example, the data modification frequency table below illustrates one example of how the modification of data may be tracked over time:

| LBA | $1^{ST}$ TIME PERIOD MODS. | $2^{ND}$ TIME PERIOD MODS. | $3^{RD}$ TIME PERIOD MODS. | $4^{TH}$ TIME PERIOD MODS. | $5^{TH}$ TIME PERIOD MODS. | $6^{TH}$ TIME PERIOD MODS. | TOTAL MODS. |
|---|---|---|---|---|---|---|---|
| $X_1$ | 5 | 4 | 7 | 5 | 8 | 6 | 35 |
| $X_2$ | 1 | 2 | 9 | 12 | 13 | 5 | 42 |
| $X_3$ | 0 | 0 | 0 | 0 | 0 | 0 | 0 |
| ... | ... | ... | ... | ... | ... | ... | ... |
| $X_N$ | 0 | 2 | 0 | 4 | 1 | 4 | 11 |
| $X_{N+1}$ | 1 | 0 | 1 | 2 | 3 | 2 | 8 |

As will be appreciated by one of skill in the art in possession of the present disclosure, the data modification frequency table above illustrates how modifications to data associated with an LBA may be tracked over multiple time periods (e.g., 6 times periods in the example above, which may be six 1-hour time periods over six hours, or any other time periods that would be apparent to one of skill in the art in possession of the present disclosure). As such, at block 406, the data storage and garbage collection engine 210 may use the data modification frequency table to determine the frequency of modification of the "current" data that is to be modified by the "modified" data received at block 404.

In some examples, the data storage and garbage collection engine 210 may require some minimum number of data points (e.g., modification entries in at least three of the six time periods in the data modification frequency table above) before acting upon a frequency of modification to write "modified" data to a data storage element that is grouped in a different superblock than the data storage element that stores the "current" data that is being modified. However, one of skill in the art in possession of the present disclosure will recognize that frequencies of modification may be acted upon quickly (e.g., "current" data is modified 100 times in the first 5 minutes following its first writing to the storage device 206) while remaining within the scope of the present disclosure as well. Furthermore, as will be appreciated by one of skill in the art in possession of the present disclosure, the data storage and garbage collection engine 210 may be configured to operate differently depending on the frequency of modification determined for the "current" data that is to be modified by the "modified" data received at block 404. For example, as discussed below, frequencies of modification may fall within a modification frequency range associated with a second superblock, and thus while in many situations that may justify the movement of the data from a data storage element grouped in a first superblock to a data storage element grouped in the second superblock, in some situations not explicitly discussed in detail below, the frequency of modification of "current" data may fall within a modification frequency range associated with a superblock that includes the data storage element in which that "current" data is currently stored, and thus the "modified" data that modifies that "current" data may be written to a data storage element that is grouped in that same superblock.

The method 400 then proceeds to block 408 where the storage device writes the first modified data to a second data storage element that is grouped in a second superblock based on the frequency of modification of the first current data. In an embodiment, at block 408, the data storage and garbage collection engine 210 may operate to write the "modified" data to a data storage element that is grouped in a superblock based on the frequency of modification determined at block 406. For example, the "current" data may be stored in a data storage element 306a-p that is grouped in the superblock 306 associated with the low-intermediate modification frequency range, and at block 406 the data storage and garbage collection engine 210 may determine that the frequency of modification of that "current" data falls within the highest modification frequency range associated with the superblock 302. As such, at block 408, the data storage and garbage collection engine 210 may write the "modified" data to a data storage element in the superblock 302 such that the "current" data becomes "old" data and the "modified" data becomes "current" data, mark the data storage element that stores the "old" data as an "invalid" data storage element, and update the modification frequency tracking for the "current" data.

In another example, the "current" data may be stored in a data storage element 304a-p that is grouped in the superblock 304 associated with the high-intermediate modification frequency range, and at block 406 the data storage and garbage collection engine 210 may determine that the frequency of modification of that "current" data falls within the lowest modification frequency range associated with the superblock 308. As such, at block 408, the data storage and garbage collection engine 210 may write the "modified" data to a data storage element in the superblock 308 such that the "current" data becomes "old" data and the "modified" data becomes "current" data, mark the data storage element that stores the "old" data as an "invalid" data storage element, and update the modification frequency tracking for the "current" data. As such, one of skill in the art in possession of the present disclosure will recognize that any "modified" data may be written to particular data storage elements that are grouped with modification-frequency-range tiered superblocks based on the modification frequency of the "current" data that is being modified by that "modified" data, which will result in high modification frequency range superblock(s) storing data with high modification frequencies, intermediate modification frequency range superblock(s) storing data with intermediate modification frequencies, and low modification frequency range superblock(s) storing data with ow modification frequencies.

The method 400 may then proceed to optional block 410 where the storage device identifies second current data that is grouped in a third superblock and that has a frequency of modification that is below a modification frequency range for the third superblock. In an embodiment, at optional block 410, the data storage and garbage collection engine 210 may be configured to periodically or continuously monitor the frequency of modification of data that is stored in a data storage element that is grouped in a superblock in order to determine whether that frequency of modification is below the modification frequency range of that superblock. As will be appreciated by one of skill in the art in possession of the present disclosure, blocks 404-408 of the method provide for the movement of data to memory frequency range tiered superblocks based on the frequency of modification of that data when modification are made to that data, and thus data that is not modified often (or at all) may remain in a data storage element that is grouped in a superblock associated with a modification frequency range that is too high for that data.

As such, at optional block 410 the data storage and garbage collection engine 210 may be configured to identify the frequency of modification of any "current" data associated with an LBA (e.g., as tracked using the LBA/PAA tables and data modification frequency tables discussed above), compare that frequency of modification to the modification frequency range associated with the superblock that includes the data storage element that stores that "current" data, and determine whether the frequency of modification for that "current" data falls below the modification frequency range of the superblock that includes the data storage element that stores that "current" data. However, while a specific technique has been described, one of skill in the art in possession of the present disclosure will recognize that other techniques for determining that the frequency of modification of data justifies moving that data to a different data storage element grouped in a different superblock will remain within the scope of the present disclosure as well.

The method 400 may then proceed to optional block 412 where the storage device writes the second current data to a fourth superblock with a lower modification frequency range than the third superblock. In an embodiment, at optional block 412 and in response to determining that the frequency of modification for "current" data falls below the modification frequency range of the superblock that includes the data storage element that stores that "current" data, the data storage and garbage collection engine 210 may write that "current" data to a data storage element in a different superblock. For example, with reference to FIG. 3, the data storage and garbage collection engine 210 may determine that "current" data stored in a data store element grouped in the superblock 306 includes a frequency of modification that is below the low-intermediate modification frequency range for the superblock 306 and, in response, may write the "current" data to a data storage element in the superblock 308 such that the "current" data in the data storage element grouped in the superblock 306 becomes "old" data and the "current" data in the data storage element grouped in the superblock 308 becomes the "current" data, and mark the data storage element that stores the "old" data as an "invalid" data storage element.

The method 400 may then return to block 402 to repeat the method 400. As such, the data storage and garbage collection engine 210 may perform the method 400 any number of times to cause data to be moved between data storage elements grouped into the superblocks 302, 304, 306, and up to 308 such that high modification frequency range superblock(s) store data with high modification frequencies, intermediate modification frequency range superblock(s) store data with intermediate modification frequencies, and low modification frequency range superblock(s) store data with ow modification frequencies. For example, FIG. 6 illustrates the modification-frequency-based tiered superblocks 300 following any number of iterations of the method 400, and is illustrated with "valid" data storage elements that store "current" data distinguished from "invalid" data storage elements that store "old" data via the shading of the "invalid" data storage elements.

Figure 6:
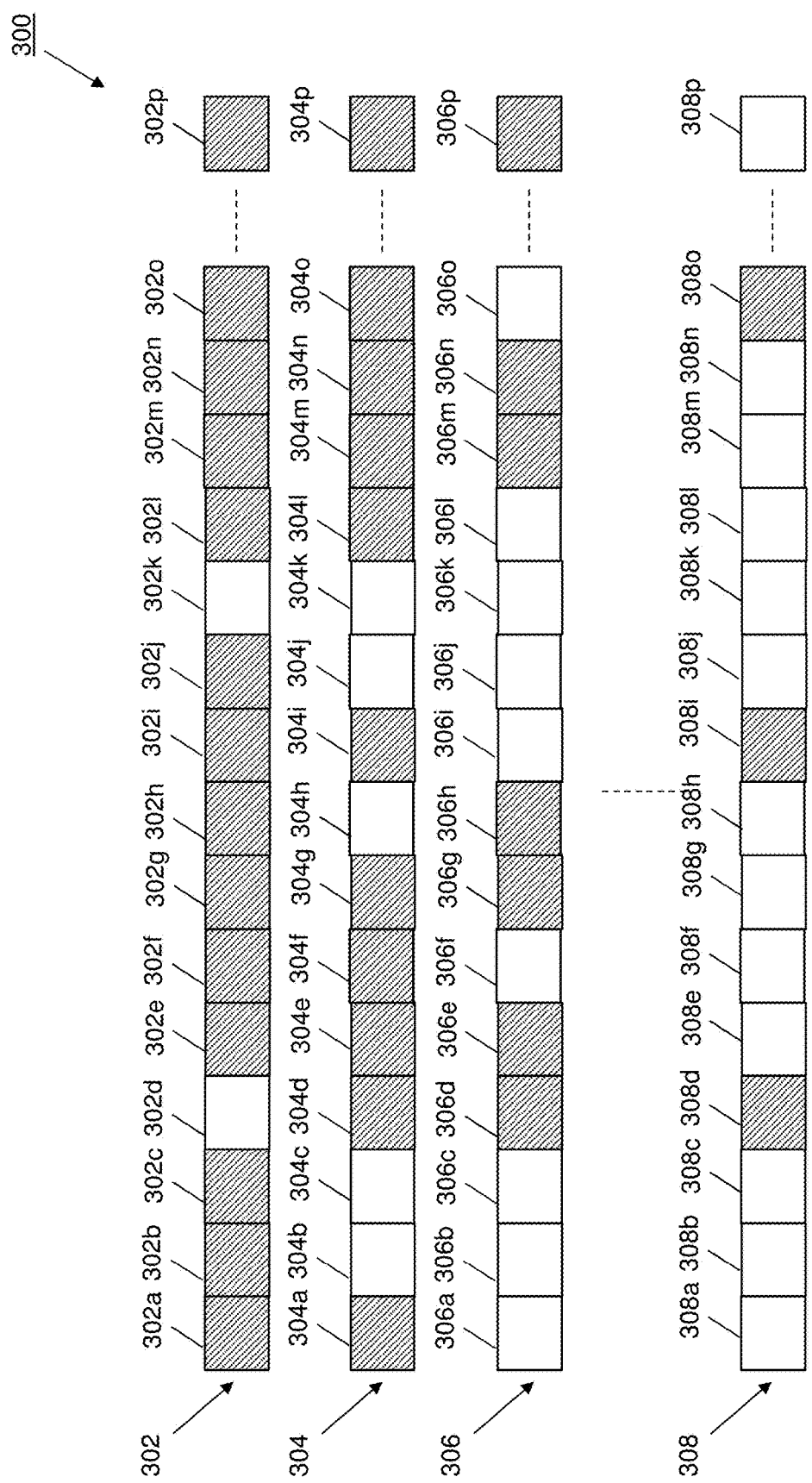
FIG. 6 is a schematic view illustrating an embodiment of the storage of data in the modification-frequency-based tiered superblocks of FIG. 3.

As can be seen in the example illustrated in FIG. 6, following several iterations of the method 400, the superblock 302 associated with the highest modification frequency range includes "invalid" data storage elements 302a-302c, 302e-302j, 302l-302o, and 302p that store "old" data, and "valid" data storage elements 302d and 302k that store "current" data; the superblock 304 associated with the high-intermediate modification frequency range includes "invalid" data storage elements 304a, 304d-304g, 304i, 304l-304o, and 304p that store "old" data, and "valid" data storage elements 304b, 304c, 304h, 304j, and 304k that store "current" data; the superblock 306 associated with the low-intermediate modification frequency range includes "invalid" data storage elements 306d, 306e, 306g, 306h, 306m, 306n, and 306p that store "old" data, and "valid" data storage elements 306a-306c, 306f, 306i-3061, and 306o that store "current" data; and the superblock 308 associated with the lowest modification frequency range includes "invalid" data storage elements 308d, 308i, and 308o that store "old" data, and "valid" data storage elements 308a-308c, 308e-308h, 308j-308n, and 308p that store "current" data. As such, the superblock 302 associated with the highest modification frequency range will be provided with the fewest "valid" data storage elements of the superblocks 302, 304, 306, and up to 308.

Figure 7A:
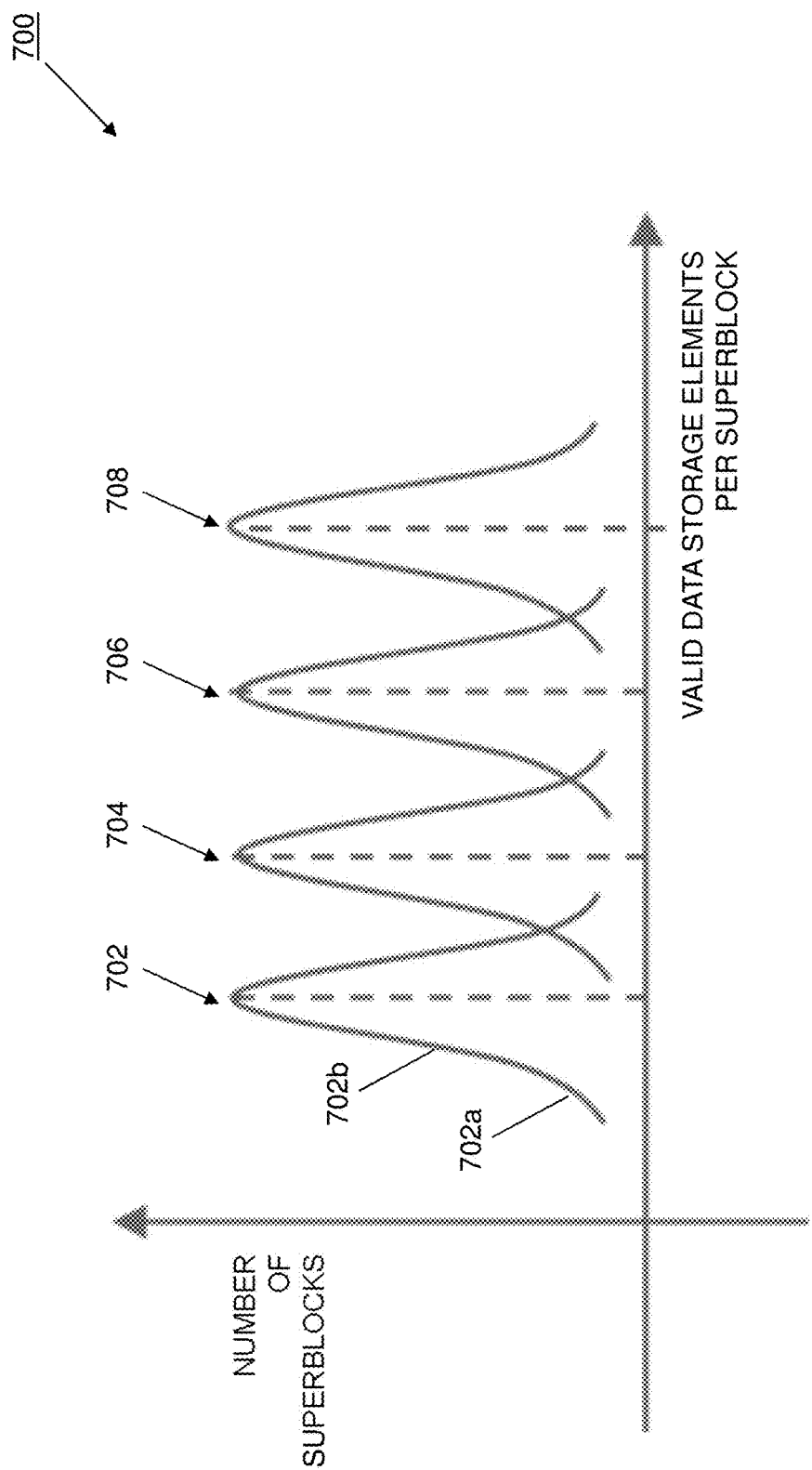
FIG. 7A is a graph view illustrating an embodiment of a distribution of valid data storage elements in superblocks in a storage device utilizing the modification-frequency-based tiered data storage garbage collection system of the present disclosure.
Figure 7B:
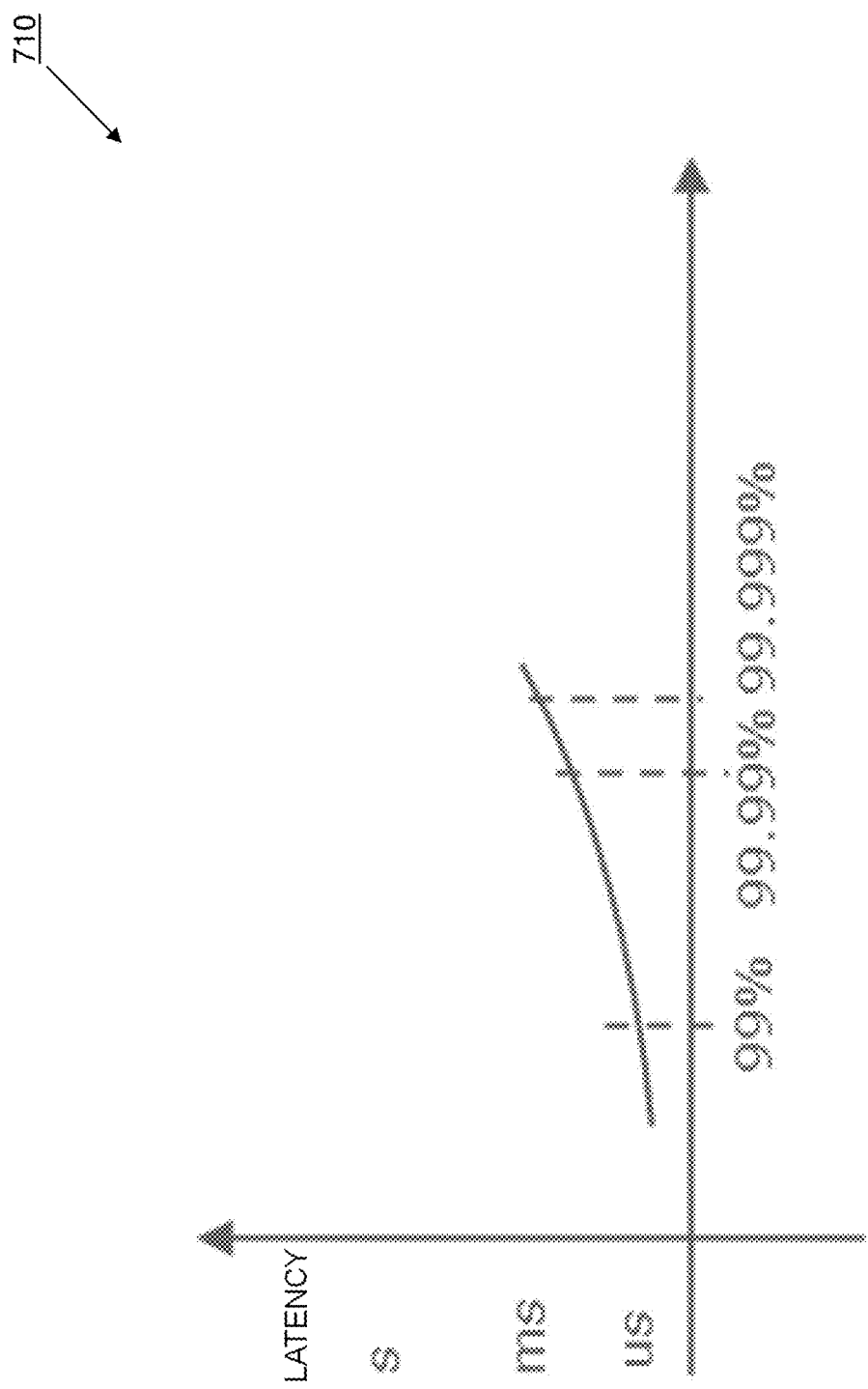
FIG. 7B is a graph view illustrating an embodiment of garbage collection latency for superblocks in a storage device utilizing the modification-frequency-based tiered data storage garbage collection system of the present disclosure.
Figure 8:
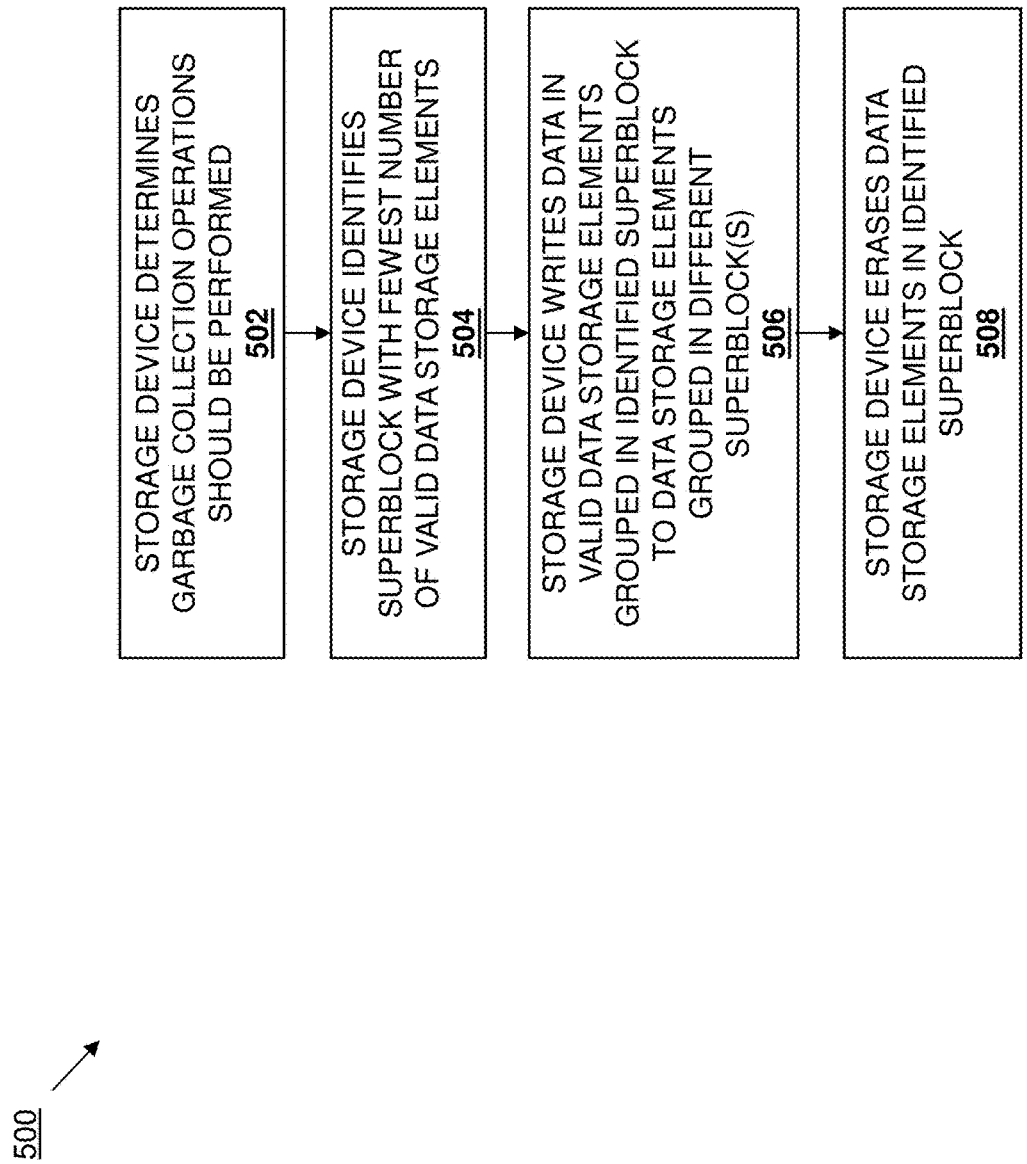
FIG. 8 is a flow chart illustrating an embodiment of a method for performing garbage collection using a tiered data storage that is based on data modification frequency.

Referring first to FIGS. 7A and 7B, graph views are provided illustrating an embodiment of distributions 700 of valid data storage elements in superblocks in a storage device provided according to the teachings of the present disclosure, as well as a garbage collection latency 710 for superblocks in a storage device provided according to the teachings of the present disclosure. As will be appreciated by one of skill in the art in possession of the present disclosure, data stored and modified in data storage elements grouped in the modification frequency range tiered superblocks will produce the distributions 700 of "valid" data storage elements in superblocks illustrated in FIG. 7A. Similarly as discussed above, the distributions 700 of "valid" data storage elements in superblocks graphs the distribution of valid data storage elements per superblock on the X-axis vs. the number of superblocks on the Y-axis, and illustrates how the number of valid data storage elements in each superblock may substantially follow bell curves that are offset for each superblock associated with a different modification frequency range tier, with a distribution 702 for the superblock associated with the highest modification frequency range, a distribution 704 for the superblock associated with the high-intermediate modification frequency range, a distribution 706 for the superblock associated with the low-intermediate modification frequency range, and a distribution 708 for the superblock associated with the lowest modification frequency range. As will be appreciated by one of skill in the art in possession of the present disclosure, the superblock with the fewest "valid" data storage elements will tend to be the superblock associated with the highest modification frequency range (because its data is modified frequently), and the distribution 702 for the superblock associated with the highest modification frequency range illustrates how the number of "valid" data storage elements in that superblock will vary within a relatively small range.

As discussed below, the storage device may select the superblock associated with the highest modification frequency range and thus having the lowest number of valid data storage elements (i.e., relative to the other superblocks utilized in the storage device) when performing garbage collection operations. As such, with reference to the distribution 702 of "valid" data storage elements in the superblock with the highest modification frequency range that will be selected for garbage collection operations, that superblock will typically include a number of valid data storage elements identified in the lower part of the bell curve at point 702a. Furthermore, similarly as discussed above, in edge cases the number of valid data storage elements in that superblock may skew higher (e.g., as identified in the higher part of the bell curve at point 702b), which can increase the time needed to perform garbage collection operations (which includes writing the data in each of those valid data storage elements to data storage elements in a different superblock.)

However, the garbage collection latency 710 for superblocks provided according to the teachings of the present disclosure and illustrated in FIG. 7B shows how, in 99% of garbage collection situations, the number of valid data storage elements in the superblock with the highest modification frequency range will be at a level that results in a latency associated with the garbage collection operations that is on the order of microseconds (μs). Furthermore, the garbage collection latency 710 for superblocks provided according to the teachings of the present disclosure and illustrated in FIG. 7B shows how, in 99%-99.99% of garbage collection situations, the number of valid data storage elements in the superblock with the highest modification frequency range will be at a level that results in a latency associated with the garbage collection operations that is between the order of microseconds (μs) to milliseconds (ms). Finally, the conventional garbage collection latency 710 for superblocks provided according to the teachings of the present disclosure and illustrated in FIG. 7B shows how, in 99.99%-99.999% of garbage collection situations, the number of valid data storage elements in the superblock with the highest modification frequency range will be at a level that results in a latency associated with the garbage collection operations that does not substantially exceed the order of milliseconds (ms). As such, edge cases (e.g., 0.001% of garbage collection situations) will results in garbage collection operations taking on the order of milliseconds, rather than on the order of seconds as occurs in conventional garbage collection systems.

Referring now to FIG. 5, an embodiment of a method 500 for performing garbage collection using a tiered data storage that is based on data modification frequency is illustrated. As discussed below, the systems and methods of the present disclosure provide for the performance of garbage collection operations using modification frequency tiered superblocks that reduce the number of valid data storage elements that may be included in a superblock upon which garbage collection operations are being performed, thus reducing or eliminating the number of edge cases in which garbage collection operation latency exceed a desirable level. For example, a storage device may determine that garbage collection operations should be performed and, in response, may identify a superblock with the fewest number of valid data storage elements (e.g., the modification frequency tiered superblock associated with the highest modification frequency range.) The storage device may then write data in the valid data storage elements that are grouped in the identified superblock to data storage elements that are grouped into one or more different superblocks, and then may erase the data storage elements that are grouped in that identified superblock. As discussed above, the storage of data in the data storage elements that are grouped in the superblock with the highest modification frequency range allows for garbage collection operations on that superblock (and particularly the writing of valid data storage elements grouped in that superblock to data storage elements grouped in other superblocks) to be performed without excessive latency even in edge cases, as the number of possible valid data storage elements grouped in that superblock is reduced relative to conventional garbage collection systems.

The method 500 begins at block 502 where the storage device determines that garbage collection operations should be performed. In an embodiment, at block 502, the data storage and garbage collection engine 210 may determine that garbage collection operations should be performed. For example, the data storage and garbage collection engine 210 may monitor a number of "free" data storage elements (e.g., data storage elements in the storage subsystems 212a-212c without any data written to them) and, in response to determining that the number of "free" data storage elements is below a particular threshold, may determine that garbage collection operations should begin (e.g., to free up more data storage elements in the storage subsystems 212a-212c.) However, while a specific technique for determining that garbage collection operations should begin has been described, one of skill in the art in possession of the present disclosure will recognize that a variety of techniques for determining that garbage collection operations should begin (e.g., on a predetermined schedule, in response to an instruction by a user, etc.) will fall within the scope of the present disclosure as well.

The method 500 then proceeds to block 504 where the storage device identifies a superblock with the fewest number of valid data storage elements. In an embodiment, at block 504, the data storage and garbage collection engine 210 may identify the superblock 302 associated with the highest modification frequency range, which as discussed above is configured to provide the superblock 302 with the fewest number of valid data storage elements (i.e., because the data provided in the data storage elements 302a-302p is modified so frequently that the majority of the data storage elements will be "invalid" data storage elements.) However, while the data storage and garbage collection engine 210 is discussed as selecting the superblock 302 associated with the highest modification frequency range to identify the superblock with the fewest number of "valid" data storage elements, in other embodiments, the data storage and garbage collection engine 210 may track the actual number of "valid" and "invalid" data storage elements in the superblocks 302, 304, 306, and up to 308, and at block 504 may determine which of those superblocks includes the fewest number of "valid" data storage elements (e.g., in the event a superblock (e.g., the superblock 304) other than the superblock 302 currently has the fewest number of "valid" data storage elements.)

The method 500 then proceeds to block 506 where the storage device writes data in valid data storage elements that are grouped in the identified superblock to data storage elements that are grouped in at least one different superblock. In an embodiment, the superblock 302 may be identified as having the fewest number of "valid" data storage elements and, at block 506, the data storage and garbage collection engine 210 may operate to write data in "valid" data storage elements in the superblock 302 to data storage elements grouped in other superblocks (e.g., any of the superblocks 304, 306, and up to 308). For example, with reference to FIG. 6, the data storage and garbage collection engine 210 may operate to may write the "current" data in the data storage element 302d in the superblock 302 to a data storage element that is grouped in one of the superblocks 304, 306, and up to 308 such that the "current" data in the data storage element 302d grouped in the superblock 302 becomes "old" data and the "current" data written to the data storage element grouped in the one of the superblocks 304, 306, and up to 308 becomes the "current" data, and mark the data storage element 302d as an "invalid" data storage element. Similarly, the data storage and garbage collection engine 210 may operate to may write the "current" data in the data storage element 302k in the superblock 302 to a data storage element that is grouped in one of the superblocks 304, 306, and up to 308 such that the "current" data in the data storage element 302k grouped in the superblock 302 becomes "old" data and the "current" data written to the data storage element grouped in the one of the superblocks 304, 306, and up to 308 becomes the "current" data, and mark the data storage element 302k as an "invalid" data storage element. One of skill in the art in possession of the present disclosure will appreciate that similar operations may be performed at block 506 with data in any "valid" data storage element that is grouped in the superblock 302.

The method 500 then proceeds to block 508 where the storage device erases data storage elements in the identified superblock. In an embodiment, at block 508, the data storage and garbage collection engine 210 may operate to erase each block that includes the data storage elements 302a-302p that are grouped in the superblock 302 in order to free up each of those data storage elements 302a-302p for the writing of data. Furthermore, one of skill in the art in possession of the present disclosure will recognize that additional superblocks may have similar garbage collection operations performed on them according to the method 500 (e.g., the storage device may perform garbage collection operations on two or more superblocks (e.g., the superblocks 302 and 304)) while remaining within the scope of the present disclosure as well.

Thus, systems and methods have been described that provide for the storage of data in data storage elements that are grouped in data-modification-frequency-based tiers of superblocks based on the frequency of modification of that data, which provides advantages during garbage collection operations by ensuring that the superblock selected for garbage collection will not have a number of valid data storage elements that result in undesirable garbage collection latency. For example, a storage device may operate to track the frequency of modification of data in data storage elements that are grouped in superblocks, and when that storage device receives modified data for any current data that is currently stored in a data storage element, it may determine the frequency of modification for that data. As such, data that is frequency modified (e.g., "hot" data) may be written to superblocks with relatively high data modification frequency ranges, while data that is infrequency modified (e.g., "cold" data) may be written to superblocks with relatively low data modification frequency ranges. Storing data in such modification-frequency-based tiers of superblocks provides valid data storage element distributions in superblocks with the lowest number of valid data storage elements that do not vary as greatly as in conventional garbage collection systems, thus reducing the amount of time needed to perform garbage collection operations in edge cases.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A modification-frequency-based tiered data storage garbage collection system, comprising:
at least one first processor; and
a first non-transitory memory that is coupled to the at least one first processor and that includes first instructions that, when executed by the at least one first processor, cause the at least one first processor to provide a host engine; and
a storage device that includes:
a plurality of storage subsystems;
at least one second processor; and
a second non-transitory memory that is coupled to the at least one second processor and that includes second instructions that, when executed by the at least one second processor, cause the at least one second processor to provide a data storage and garbage collection engine that is coupled to the host engine and the plurality of storage subsystems, wherein the data storage and garbage collection engine is configured to:
receive, from the host engine, first data that is not associated with a Logical Block Address (LBA) in a Logical Block Address/Physical Allocation Address (LBA/PAA) table;
store, based on a type of the first data that is associated with a first data modification frequency range, the first data in a first data storage element that is provided by one of the plurality of storage subsystems and that is grouped in a first superblock that is associated with the first data modification frequency range, wherein the storage of the first data provides first stored data;
modify, following the storage of the first stored data, the first stored data to provide first modified data in the first data storage element;
receive, from the host engine, second modified data that provides a modification to the first modified data that is stored in the first data storage element;
determine, in response to receiving the second modified data, that the first modified data has been modified over at least two different time periods;
determine a first frequency of modification of the first modified data that identifies a number of times the first modified data has been modified over the at least two different time periods and that falls within a second data modification frequency range that is different than the first data modification frequency range; and write, based on the first frequency of modification of the first modified data and in response to determining that the first modified data has been modified over the at least two time periods, the second modified data to a second data storage element that is provided by one of the plurality of storage subsystems and that is grouped in a second superblock that is different than the first superblock and that is associated with the second data modification frequency range.

2. The system of claim 1, wherein the data storage and garbage collection engine is configured to:
track a frequency of modification of data stored in a plurality of data storage elements that are provided by the plurality of storage subsystems and grouped into a plurality of superblocks.

3. The system of claim 1, wherein the second data modification frequency range is greater than the first data modification frequency range.

4. The system of claim 1, wherein the second data modification frequency range is less than the first data modification frequency range.

5. The system of claim 4, wherein the data storage and garbage collection engine is configured to:
determine that garbage collection operations should be performed;
identify the first superblock as including a fewest number of valid data storage elements;
write, in response to identifying the first superblock as including the fewest number of valid data storage elements, data included on any data storage element that is provided by the plurality of storage subsystems and grouped in the first superblock to a respective data storage element that is provided by one of the plurality of storage subsystems and grouped in a superblock that is different than the first superblock; and
erase, subsequent to writing the data to the respective data storage elements that are provided by the plurality of storage subsystems and grouped in the superblock that is different than the first superblock, each data storage element that is grouped in the first superblock.

6. The system of claim 1, wherein the storage device is provided by a Solid State Drive (SSD) storage device.

7. An Information Handling System (IHS), comprising:
at least one processor; and
a first non-transitory memory that is coupled to the at least one processor and that includes instructions that, when executed by the at least one processor, cause the at least one processor to provide a data storage and garbage collection engine that is configured to:
receive, from a host engine, first data that is not associated with a Logical Block Address (LBA) in a Logical Block Address/Physical Allocation Address (LBA/PAA) table;
store, based on a type of the first data that is associated with a first data modification frequency range, the first data in a first data storage element that is provided by one of a plurality of storage subsystems and that is grouped in a first superblock that is associated with the first data modification frequency range, wherein the storage of the first data provides first stored data;
modify, following the storage of the first stored data, the first stored data to provide first modified data in the first data storage element;
receive, from the host engine, second modified data that provides a modification to the first modified data;
determine, in response to receiving the second modified data, that the first modified data has been modified over at least two different time periods;
determine a first frequency of modification of the first modified data that identifies a number of times the first modified data has been modified over the at least two different time periods and that falls within a second data modification frequency range that is different than the first data modification frequency range; and
write, based on the first frequency of modification of the first modified data and in response to determining that the first modified data has been modified over the at least two time periods, the second modified data to a second data storage element that is provided by one of the plurality of storage subsystems and that is grouped in a second superblock that is different than the first superblock and that is associated with the second data modification frequency range.

8. The IHS of claim 7, wherein the data storage and garbage collection engine is configured to:
track a frequency of modification of data stored in a plurality of data storage elements that are provided by the plurality of storage subsystems and grouped into a plurality of superblocks.

9. The IHS of claim 8, wherein the tracking the frequency of modification of the data includes maintaining the LBA/PAA table that updates the frequency of modification of data associated with each LBA.

10. The IHS of claim 7, wherein the second data modification frequency range is greater than the first data modification frequency range.

11. The IHS of claim 7, wherein the second data modification frequency range is less than the first data modification frequency range.

12. The IHS of claim 11, wherein the data storage and garbage collection engine is configured to:
determine that garbage collection operations should be performed;
identify the first superblock as including a fewest number of valid data storage elements;
write, in response to identifying the first superblock as including the fewest number of valid data storage elements, data included on any data storage element that is provided by the plurality of storage subsystems and grouped in the first superblock to a respective data storage element that is provided by one of the plurality of storage subsystems and grouped in a superblock that is different than the first superblock; and
erase, subsequent to writing the data to the respective data storage elements that are provided by the plurality of storage subsystems and grouped in the superblock that is different than the first superblock, each data storage element that is grouped in the first superblock.

13. The IHS of claim 7, wherein the plurality of storage subsystems are included in a Solid State Drive (SSD) storage device.

14. A method for performing garbage collection using a tiered data storage that is based on data modification frequency, comprising:
receiving, by a storage device from a host engine, first data that is not associated with a Logical Block Address (LBA) in a Logical Block Address/Physical Allocation Address (LBA/PAA) table;

storing, by the storage device and based on a type of the first data that is associated with a first data modification frequency range, the first data in a first data storage element that is provided by one of a plurality of storage subsystems and that is grouped in a first superblock that is associated with the first data modification frequency range, wherein the storage of the first data provides first stored data;

modifying, by the storage device following the storage of the first stored data, the first stored data to provide first modified data in the data storage element;

receiving, by the storage device from the host engine, second modified data that provides a modification to the first modified data, that is stored in the first data storage element;

determining, by the storage device in response to receiving the second modified data, that the first modified data has been modified over at least two different time periods;

determining, by the storage device, a first frequency of modification of the first modified data that identifies a number of times the first modified data has been modified over the at least two different time periods and that falls within a second data modification frequency range that is different than the first data modification frequency range; and writing, by the storage device based on the first frequency of modification of the first modified data and in response to determining that the first modified data has been modified over the at least two time periods, the second modified data to a second data storage element that is provided by one of the plurality of storage subsystems and that is grouped in a second superblock that is different than the first superblock and that is associated with the second data modification frequency range.

15. The method of claim 14, further comprising:
tracking, by the storage device, a frequency of modification of data stored in a plurality of data storage elements that are provided by the plurality of storage subsystems and grouped into a plurality of superblocks.

16. The method of claim 15, wherein the tracking the frequency of modification of the data includes maintaining the LBA/PAA table that updates the frequency of modification of data associated with each LBA.

17. The method of claim 14, wherein the second data modification frequency range is greater than the first data modification frequency range.

18. The method of claim 14, wherein the second data modification frequency range is less than the first data modification frequency range.

19. The method of claim 18, further comprising:
determining, by the storage device, that garbage collection operations should be performed;
identifying, by the storage device, the first superblock as including a fewest number of valid data storage elements;
writing, by the storage device in response to identifying the first superblock as including the fewest number of valid data storage elements, data included on any data storage element that is provided by the plurality of storage subsystems and grouped in the first superblock to a respective data storage element that is provided by one of the plurality of storage subsystems and grouped in a superblock that is different than the first superblock; and
erasing, storage device subsequent to writing the data to the respective data storage elements that are provided by the plurality of storage subsystems and grouped in the superblock that is different than_the first superblock, each data storage element that is grouped in the first superblock.

20. The method of claim 14, wherein the storage device is provided by a Solid State Drive (SSD) storage device.

* * * * *

UNITED STATES PATENT AND TRADEMARK OFFICE
CERTIFICATE OF CORRECTION

| | |
|---|---|
| PATENT NO. | : 11,281,573 B2 |
| APPLICATION NO. | : 16/672071 |
| DATED | : March 22, 2022 |
| INVENTOR(S) | : Dong et al. |

Page 1 of 1

It is certified that error appears in the above-identified patent and that said Letters Patent is hereby corrected as shown below:

In the Claims

Claim 14, Column 23, Line 11, "modified data in the data storage element;" should be changed to --modified data in the first data storage element;--.

Signed and Sealed this
Twenty-eighth Day of June, 2022

Katherine Kelly Vidal
*Director of the United States Patent and Trademark Office*